United States Patent
Mohajerani et al.

(10) Patent No.: US 12,407,253 B2
(45) Date of Patent: Sep. 2, 2025

(54) DUAL ACTIVE BRIDGE CONVERTER CONTROL WITH SELECT INACTIVE STATES FOR LOSS DISTRIBUTION

(71) Applicant: Rivian IP Holdings, LLC, Irvine, CA (US)

(72) Inventors: Zahra Mohajerani, Los Angeles, CA (US); Lixiang Wei, Irvine, CA (US); Shenli Zou, Redondo Beach, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 911 days.

(21) Appl. No.: 17/554,938

(22) Filed: Dec. 17, 2021

(65) Prior Publication Data

US 2023/0198393 A1 Jun. 22, 2023

(51) Int. Cl.
*H02M 3/158* (2006.01)
*B60L 53/60* (2019.01)

(52) U.S. Cl.
CPC ............. *H02M 3/158* (2013.01); *B60L 53/60* (2019.02)

(58) Field of Classification Search
CPC ................................ H02M 3/158; B60L 53/60
See application file for complete search history.

(56) References Cited

U.S. PATENT DOCUMENTS

| 2015/0097434 A1* | 4/2015 | Harrison | H02M 7/4807 307/43 |
| 2020/0362823 A1* | 11/2020 | Helle | H02M 1/0054 |
| 2021/0249962 A1* | 8/2021 | Watanabe | H02M 1/0054 |

FOREIGN PATENT DOCUMENTS

| CN | 107070241 A | 8/2017 |
| DE | 4413163 A1 | 10/1995 |
| DE | 102004036160 A1 | 2/2005 |
| JP | 2010-011625 A | 1/2010 |

* cited by examiner

*Primary Examiner* — Rafael O De Leon Domenech
(74) *Attorney, Agent, or Firm* — Haley Guiliano LLP

(57) ABSTRACT

Systems, methods, and computer-readable media for controlling a dual active bridge converter to distribute switching losses are disclosed herein. A plurality of switch control signals are provided to a plurality of switches, respectively, of at least one bridge of a dual active bridge converter. The plurality of switches comprises top switches and bottom switches. Control circuitry causes the plurality of switch control signals to switch according to a switching sequence comprising a plurality of stages. During at least one of the plurality of stages, the top switches are enabled concurrently with one another or the bottom switches are enabled concurrently with one another.

16 Claims, 11 Drawing Sheets

502-1

508-1 Top-Zero Switching Sequence (Primary Bridge) 512-1

| Stage | Time Index Range 510-1 | Switch | Switch Control Signal Value |
|---|---|---|---|
| 1 (Active) | Time Range$_{sw1seq1stg1}$ | 1 | 0 |
| | Time Range$_{sw2seq1stg1}$ | 2 | 1 |
| | Time Range$_{sw3seq1stg1}$ | 3 | 1 |
| | Time Range$_{sw4seq1stg1}$ | 4 | 0 |
| 2 (Inactive) | Time Range$_{sw1seq1stg2}$ | 1 | 1 |
| | Time Range$_{sw2seq1stg2}$ | 2 | 0 |
| | Time Range$_{sw3seq1stg2}$ | 3 | 1 |
| | Time Range$_{sw4seq1stg2}$ | 4 | 0 |
| 3 (Active) | Time Range$_{sw1seq1stg3}$ | 1 | 1 |
| | Time Range$_{sw2seq1stg3}$ | 2 | 0 |
| | Time Range$_{sw3seq1stg3}$ | 3 | 0 |
| | Time Range$_{sw4seq1stg3}$ | 4 | 1 |
| 4 (Inactive) | Time Range$_{sw1seq1stg4}$ | 1 | 1 |
| | Time Range$_{sw2seq1stg4}$ | 2 | 0 |
| | Time Range$_{sw3seq1stg4}$ | 3 | 1 |
| | Time Range$_{sw4seq1stg4}$ | 4 | 0 |

504-1

516-1 Bottom-Zero Switching Sequence (Primary Bridge) 520-1

| Stage | Time Index Range 518-1 | Switch | Switch Control Signal Value |
|---|---|---|---|
| 1 (Active) | Time Range$_{sw1seq2stg1}$ | 1 | 0 |
| | Time Range$_{sw2seq2stg1}$ | 2 | 1 |
| | Time Range$_{sw3seq2stg1}$ | 3 | 1 |
| | Time Range$_{sw4seq2stg1}$ | 4 | 0 |
| 2 (Inactive) | Time Range$_{sw1seq2stg2}$ | 1 | 0 |
| | Time Range$_{sw2seq2stg2}$ | 2 | 1 |
| | Time Range$_{sw3seq2stg2}$ | 3 | 0 |
| | Time Range$_{sw4seq2stg2}$ | 4 | 1 |
| 3 (Active) | Time Range$_{sw1seq2stg3}$ | 1 | 1 |
| | Time Range$_{sw2seq2stg3}$ | 2 | 0 |
| | Time Range$_{sw3seq2stg3}$ | 3 | 0 |
| | Time Range$_{sw4seq2stg3}$ | 4 | 1 |
| 4 (Inactive) | Time Range$_{sw1seq2stg4}$ | 1 | 0 |
| | Time Range$_{sw2seq2stg4}$ | 2 | 1 |
| | Time Range$_{sw3seq2stg4}$ | 3 | 0 |
| | Time Range$_{sw4seq2stg4}$ | 4 | 1 |

FIG. 5A 502-2

506-2 508-2 Top-Zero Switching Sequence 512-2
(Secondary Bridge) 510-2

| Stage | Time Index Range | Switch | Switch Control Signal Value |
|---|---|---|---|
| 1 (Active) | Time Range$_{sw5seq1stg1}$ | 5 | 0 |
| | Time Range$_{sw6seq1stg1}$ | 6 | 1 |
| | Time Range$_{sw7seq1stg1}$ | 7 | 1 |
| | Time Range$_{sw8seq1stg1}$ | 8 | 0 |
| 2 (Inactive) | Time Range$_{sw5seq1stg2}$ | 5 | 1 |
| | Time Range$_{sw6seq1stg2}$ | 6 | 0 |
| | Time Range$_{sw7seq1stg2}$ | 7 | 0 |
| | Time Range$_{sw8seq1stg2}$ | 8 | 1 |
| 3 (Active) | Time Range$_{sw5seq1stg3}$ | 5 | 1 |
| | Time Range$_{sw6seq1stg3}$ | 6 | 0 |
| | Time Range$_{sw7seq1stg3}$ | 7 | 0 |
| | Time Range$_{sw8seq1stg3}$ | 8 | 1 |
| 4 (Inactive) | Time Range$_{sw5seq1stg4}$ | 5 | 1 |
| | Time Range$_{sw6seq1stg4}$ | 6 | 0 |
| | Time Range$_{sw7seq1stg4}$ | 7 | 1 |
| | Time Range$_{sw8seq1stg4}$ | 8 | 0 |

504-2

514-2 516-2 Bottom-Zero Switching Sequence 520-2
(Secondary Bridge) 518-2

| Stage | Time Index Range | Switch | Switch Control Signal Value |
|---|---|---|---|
| 1 (Active) | Time Range$_{sw5seq2stg1}$ | 5 | 0 |
| | Time Range$_{sw6seq2stg1}$ | 6 | 1 |
| | Time Range$_{sw7seq2stg1}$ | 7 | 1 |
| | Time Range$_{sw8seq2stg1}$ | 8 | 0 |
| 2 (Inactive) | Time Range$_{sw5seq2stg2}$ | 5 | 0 |
| | Time Range$_{sw6seq2stg2}$ | 6 | 1 |
| | Time Range$_{sw7seq2stg2}$ | 7 | 0 |
| | Time Range$_{sw8seq2stg2}$ | 8 | 1 |
| 3 (Active) | Time Range$_{sw5seq2stg3}$ | 5 | 1 |
| | Time Range$_{sw6seq2stg3}$ | 6 | 0 |
| | Time Range$_{sw7seq2stg3}$ | 7 | 0 |
| | Time Range$_{sw8seq2stg3}$ | 8 | 1 |
| 4 (Inactive) | Time Range$_{sw5seq2stg4}$ | 5 | 0 |
| | Time Range$_{sw6seq2stg4}$ | 6 | 1 |
| | Time Range$_{sw7seq2stg4}$ | 7 | 0 |
| | Time Range$_{sw8seq2stg4}$ | 8 | 1 |

FIG. 5B

DUAL ACTIVE BRIDGE CONVERTER CONTROL WITH SELECT INACTIVE STATES FOR LOSS DISTRIBUTION

INTRODUCTION

The present disclosure relates to dual active bridge converters and, more particularly, to systems and related processes for controlling a dual active bridge converter in a manner that improves its power rating by enabling certain of its switches to implement inactive states during a switching cycle and distribute losses among its switches.

SUMMARY

Dual active bridge converters are utilized to provide direct current-to-direct current (DC-DC) conversion for a multitude of applications. One such application is an electric vehicle charging station, in which a dual active bridge converter receives a DC voltage derived from an AC power grid, converts the received DC voltage to another DC voltage, and provides the converted DC voltage to a charging port of an electric vehicle. The present disclosure provides systems, methods, and computer-readable media for controlling a dual active bridge converter in a manner that improves its overall power rating and operates beneath a thermal limit by enabling certain of its switches to implement inactive states (sometimes referred to as "zero states") during a switching cycle to distribute and/or balance the switching loss among its switches. Such control of a dual active bridge converter is advantageous over that of conventionally controlled dual active bridge converters, that have power ratings limited by unbalanced thermal performance in switches. In particular, conventional dual active bridge converters controlled by pulse width modulation (PWM) switch control signal patterns may have dissimilar switching characteristics for switches of different bridge legs. Such conventional PWM switch control signal patterns can lead to a difference in switching losses among bridge legs as well as a thermal difference among bridge legs, thereby limiting the power rating of the dual active bridge converter.

The present disclosure provides systems and related methods that enable certain switches of a dual active bridge converter to implement uneven inactive states during a switching cycle and distribute losses among its switches to yield an improved power rating. According to one example method, a plurality of switch control signals are provided to a plurality of switches, respectively, of at least one bridge of a dual active bridge converter. The plurality of switches comprises top switches and bottom switches. Control circuitry causes the plurality of switch control signals to switch according to a switching sequence, comprising a plurality of stages. During at least one of the plurality of inactive stages, the top switches are enabled concurrently with one another or the bottom switches are enabled concurrently with one another. Instead of having an equal number of inactive stages on top switches and bottom switches for a single switching cycle, in some embodiments the top switches have a greater number of inactive stages during the switching cycle than the bottom switches, or the bottom switches have a greater number of inactive stages during the cycle than the top switches.

In some examples, the top switches are enabled concurrently with one another during at least one of the plurality of stages of the switching cycle, and the bottom switches are prevented from being enabled concurrently with one another during any of the stages of the switching cycle.

In other examples, the bottom switches are enabled concurrently with one another during at least one of the plurality of stages of the switching cycle, and the top switches are prevented from being enabled concurrently with one another during any of the stages of the switching cycle.

In another aspect, the plurality of switches have respective terminals coupled to a transformer, and enabling each of the top switches concurrently with one another or enabling each of the bottom switches concurrently with one another drives a voltage, which is applied to the transformer, toward zero volts during the at least one of the plurality of stages.

The top switches, in a further example, are enabled concurrently with one another during two distinct stages from among the plurality of stages of the switching cycle.

In yet another aspect, the bottom switches are enabled concurrently with one another during two distinct stages from among the plurality of stages of the switching cycle.

In one aspect, the dual active bridge converter comprises a transformer having a plurality of terminals, each of the plurality of switches is a transistor having a source terminal and a drain terminal, each of the top switches has a source terminal coupled to one of the terminals of the transformer, and each of the bottom switches has a drain terminal coupled to one of the terminals of the transformer.

The method, in a further example, comprises causing, using the control circuitry, the plurality of switch control signals to toggle between switching according to a first switching sequence during a first switching cycle, and switching according to a second switching sequence during a second cycle. The top switches are enabled concurrently with one another during at least one stage of the first switching cycle. The bottom switches not enabled concurrently with one another during any stage of the first switching cycle. The bottom switches are enabled concurrently with one another during at least one stage of the second switching cycle. The top switches are not enabled concurrently with one another during any stage of the second switching cycle.

The method, in yet a further example, comprises retrieving, from memory, data defining at least one of the first switching sequence or the second switching sequence. The plurality of switch control signals are caused to switch according to at least one of the first switching sequence or the second switching sequence based on the retrieved data.

In another aspect, the plurality of stages comprises an active stage, during which the plurality of switch control signals are set to a state that drives a voltage applied to a transformer away from zero volts, and an inactive stage, during which the plurality of switch control signals are set to a state that drives a voltage applied to the transformer toward zero volts.

In another aspect, causing the plurality of switch control signals to switch according to the switching sequence comprises utilizing pulse width modulation signals that are center-aligned with respect to one another to drive the plurality of switch control signals, thereby generating a quiet zone for sampling in between level transitions of the plurality of switch control signals.

In accordance with another aspect of the disclosure, a system for controlling a dual active bridge converter is described. The system includes control circuitry, a memory storing instructions, and output ports. The control circuitry, which is coupled to the memory and the output ports, is configured to execute the instructions to provide a plurality of switch control signals to a plurality of switches, respectively, of at least one bridge of the dual active bridge converter. The plurality of switches comprises top switches and bottom switches. The control circuitry causes the plurality of switch control signals to switch according to a switching sequence, comprising a plurality of stages. During at least one of the plurality of stages of the switching cycle, the top switches are enabled concurrently with one another or the bottom switches are enabled concurrently with one another.

In some examples, the control circuitry is configured to enable the top switches concurrently with one another during at least one of the plurality of stages of the switching cycle, and prevent the bottom switches from being enabled concurrently with one another during any of the stages of the switching cycle.

In other examples, the control circuitry is configured to enable the bottom switches concurrently with one another during at least one of the plurality of stages of the switching cycle, and prevent the top switches from being enabled concurrently with one another during any of the stages of the switching cycle.

In another aspect, the plurality of switches have respective terminals coupled to a transformer, and enabling each of the top switches concurrently with one another or enabling each of the bottom switches concurrently with one another drives a voltage, which is applied to the transformer, toward zero volts during the at least one of the plurality of stages.

The control circuitry, in a further example, is configured to enable the top switches concurrently with one another during two distinct stages from among the plurality of stages of the switching cycle.

In yet another aspect, the control circuitry is configured to enable the bottom switches concurrently with one another during two distinct stages from among the plurality of stages of the switching cycle.

In one aspect, the dual active bridge converter comprises a transformer having a plurality of terminals, each of the plurality of switches is a transistor having a source terminal and a drain terminal, each of the top switches has a source terminal coupled to one of the terminals of the transformer, and each of the bottom switches has a drain terminal coupled to one of the terminals of the transformer.

In a further example, causing the plurality of switch control signals to switch according to the switching sequence comprises utilizing pulse width modulation signals that are center-aligned with respect to one another to drive the plurality of switch control signals, thereby generating a quiet zone for sampling in between level transitions of the plurality of switch control signals.

In accordance with another aspect of the disclosure, a non-transitory computer-readable medium is described, having instructions stored thereon that, when executed by control circuitry, cause the control circuitry to control a dual active bridge converter by providing a plurality of switch control signals to a plurality of switches, respectively, of at least one bridge of the dual active bridge converter. The plurality of switches comprises top switches and bottom switches. The plurality of switch control signals are caused to switch according to a switching sequence, comprising a plurality of stages. During at least one of the plurality of stages, the top switches are enabled concurrently with one another or the bottom switches are enabled concurrently with one another.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 5A depicts data structures for an illustrative time-based top-zero switching sequence and bottom-zero switching sequence for utilization in controlling switches of a primary bridge of a dual active bridge converter, in accordance with some embodiments of the disclosure;

FIG. 5B depicts data structures for an illustrative time-based top-zero switching sequence and bottom-zero switching sequence for utilization in controlling switches of a secondary bridge of a dual active bridge converter, in accordance with some embodiments of the disclosure;

DETAILED DESCRIPTION

Figure 1:
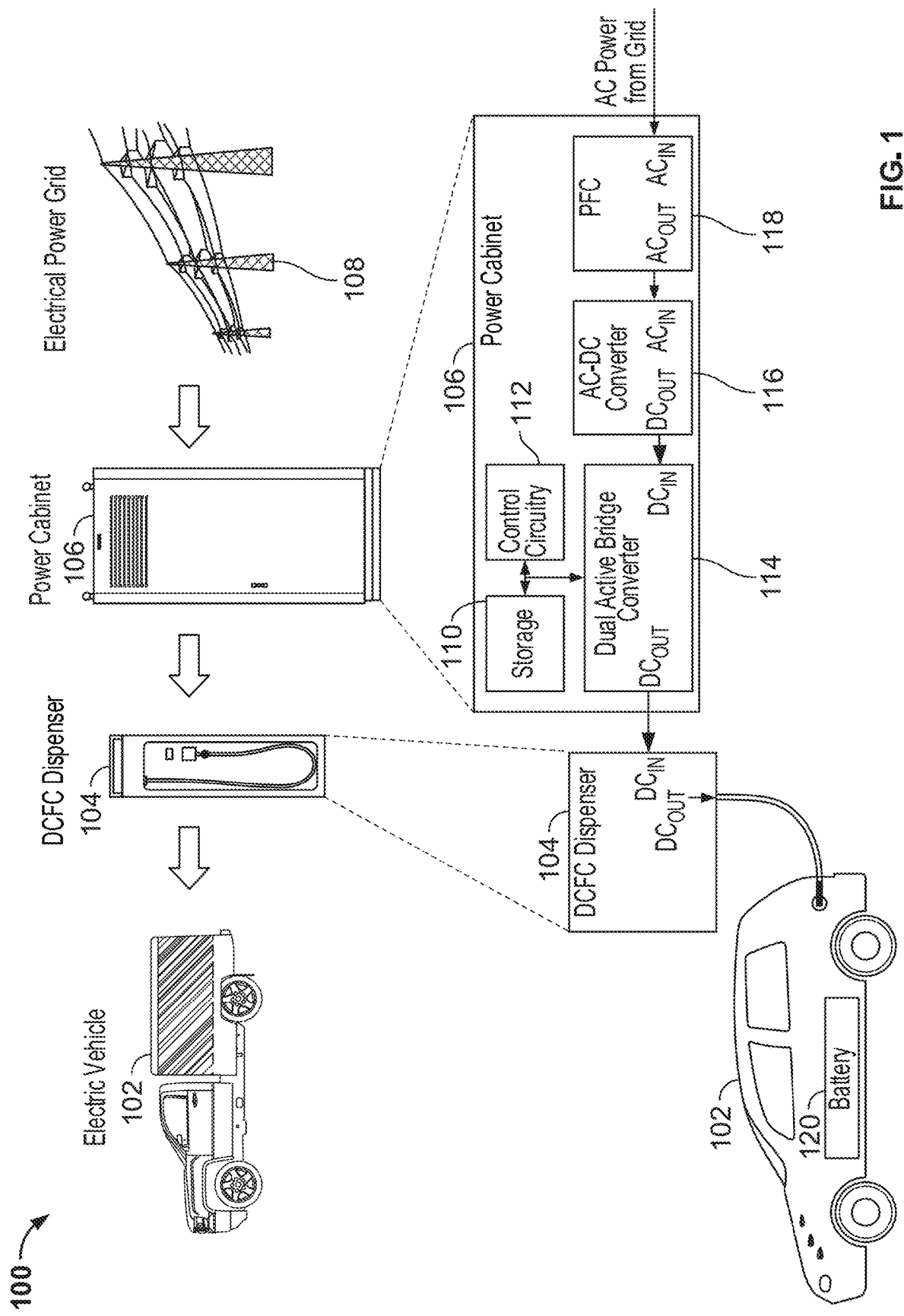
FIG. 1 shows an illustrative block diagram of an electric vehicle charging system including a dual active bridge converter with switching loss distribution, in accordance with some embodiments of the disclosure.

FIG. 1 shows an illustrative block diagram of an electric vehicle charging system 100 including a dual active bridge converter, in accordance with some embodiments of the disclosure. System 100 includes electric vehicle 102, direct current fast charger (DCFC) dispenser 104, power cabinet 106, and electrical power grid 108. Electric vehicle 102 includes rechargeable battery 120. Power cabinet 106 includes storage 110, control circuitry 112, dual active bridge (DAB) converter 114, AC-DC converter 116, and power factor correction (PFC) circuitry 118. Power cabinet 106 is coupled to electrical power grid 108 via one or more wired electrical power signal paths, by which electrical power grid 108 provides alternating current (AC) electrical power, such as in the form of a three-phase 480 volt (V) 60 hertz (Hz) signal, to power cabinet 106. PFC circuitry 118 performs power factor correction upon the AC electrical power received from electrical power grid 108, and outputs a power factor corrected AC power signal to AC-DC converter 116. AC-DC converter 116 converts the power factor corrected AC power signal received from PFC circuitry 118 into a DC signal, such as a signal fixed at a voltage in a range from 200 to 920 V and a maximum current of 500 amps (A) at a maximum power of 300 kilowatts (KW). AC-DC converter 116 provides the DC signal to DAB converter 114, which converts the received DC signal into an output DC signal that is provided, by way of DCFC dispenser 104, to charge battery 120 via a charging port of electric vehicle 102. As described in further detail below, control circuitry 112, which is electrically coupled to storage 110 and DAB converter 114, is configured to control DAB converter 114 to transfer power to battery 120 in an efficient manner by distributing and balancing switching loss among its switches by enabling only certain of its switches (e.g., only bottom switches or only top switches, but not both bottom and top switches) to implement inactive states during a switching cycle.

Figure 2:
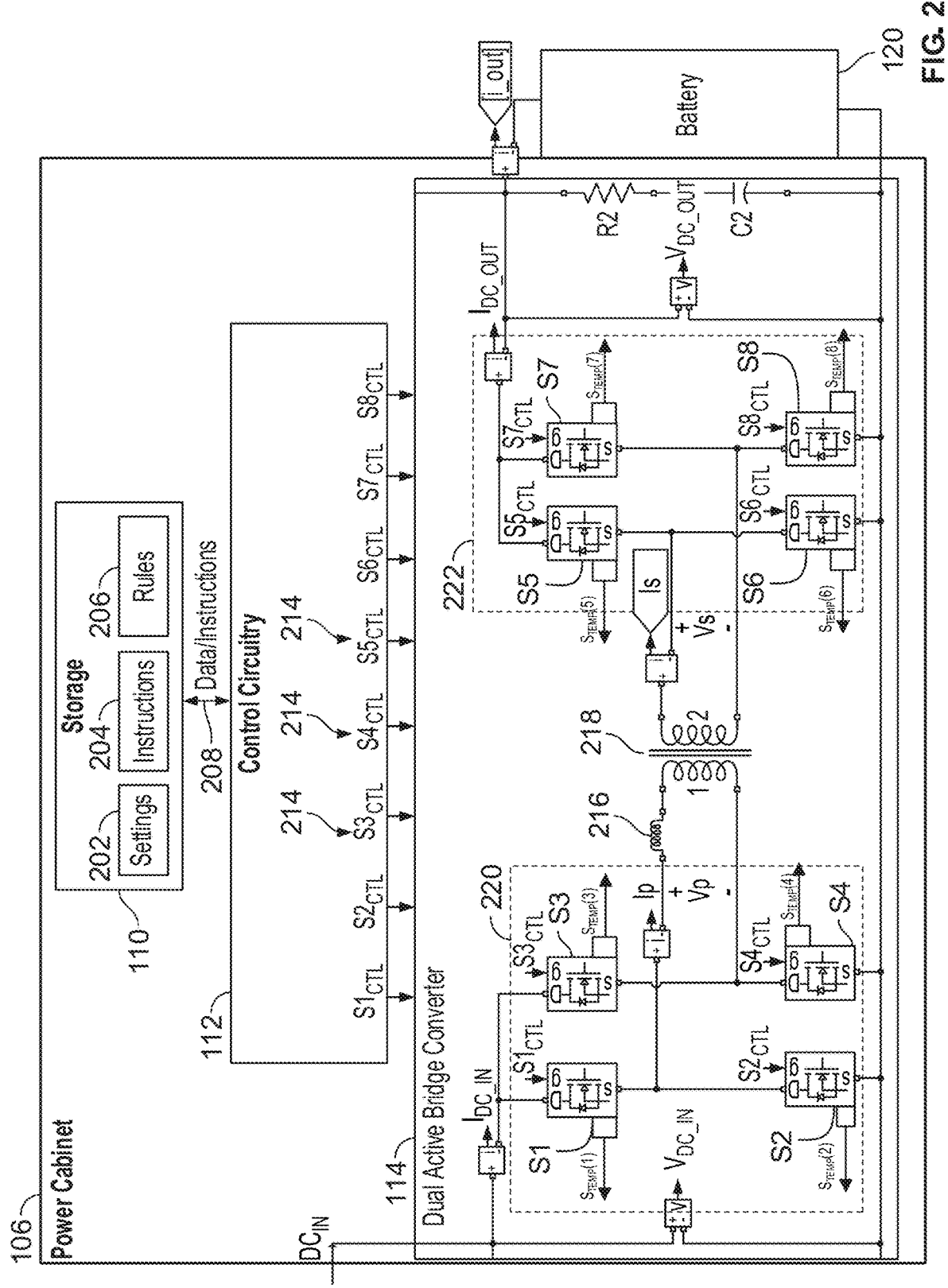
FIG. 2 is an illustrative block diagram showing additional details of a direct current fast charger dispenser of the electric vehicle charging system of FIG. 1, in accordance with some embodiments of the disclosure.

FIG. 2 is an illustrative block diagram showing additional details of some components of power cabinet 106, in accordance with some embodiments of the disclosure. Storage 110 may be an electronic storage device. As referred to herein, the phrase "electronic storage device" or "storage device" should be understood to mean any device for storing electronic data, computer software, or firmware, such as random-access memory, read-only memory, solid state devices, or any other suitable fixed or removable storage devices, and/or any combination of the same. Storage 110 may be used to store various types of instructions, rules, and/or other types of data. In some embodiments, control circuitry 112 executes instructions for an application stored in storage 110. Specifically, control circuitry 112 may be instructed by the application to perform the functions discussed herein. In some implementations, any action performed by control circuitry 112 may be based on instructions received from the application. For example, the application may be implemented as software or a set of executable instructions that may be stored in storage 110 and executed by control circuitry 112.

Storage 110, in some aspects, stores settings 202, instructions 204, and rules 206. Example types of settings 202 may include temperature thresholds, settings for toggling between using top switches or bottom switches to implement inactive states, and/or other types of settings. Example types of rules 206 include computational constants (e.g., values of inductors and/or transformers of DAB converter 114), look-up-tables (e.g., such as data structures 502-1, 504-1, 502-2, and 504-2 in FIGS. 5A and 5B) that define switching sequences, and/or other types of information or data. In some aspects, instructions 204 are executed by control circuitry 112 to implement steps of various methods described herein.

DAB converter 114 includes transformer 218, a primary side bridge 220 and a secondary side bridge 222. Primary side bridge 220 is coupled to a primary side of transformer 218 via series inductor 216. Secondary side bridge 222 is coupled to a secondary side of transformer 218. As used herein, the "primary side" of DAB converter 114 refers to the portion of DAB converter 114 appearing to the left of transformer 218 in FIG. 2, and the "secondary side" of DAB converter 114 refers to the portion of DAB converter 114 appearing to the right of transformer 218 in FIG. 2. As used herein, Vp and Vs refer to the voltage on the primary side of transformer 218 and the voltage on the secondary side of transformer 218, respectively. DAB converter 114 also includes primary side switches S1, S2, S3, and S4 located on the primary side of DAB converter 114 and secondary side switches S5, S6, S7, and S8 located on the secondary side of DAB converter 114. Switches S1, S2, S3, S4, S5, S6, S7, and S8 may be any suitable type of electronic switch, such as a field effect transistor (FET)-based switch, that can be enabled (e.g., switched on/closed, during which current is permitted to be conducted between its source and drain terminal) or disabled (e.g., off/open, during which current is effectively prevented from being conducted between its source and drain terminal) by changing a logic level of the control signal provided to its gate terminal, for example from a logic-high to a logic-low.

Control circuitry 112 includes storage interface port 208 and multiple output ports 214. Control circuitry 112 is configured to transmit and receive instructions, settings, rules, and/or other types of data to and from storage 110 via storage interface port 208. Output ports 214 include primary switching control ports $S1_{CTL}$, $S2_{CTL}$, $S3_{CTL}$, and $S4_{CTL}$, by which control circuitry 112 provides respective switch control signals to respective switching control ports $S1_{CTL}$, $S2_{CTL}$, $S3_{CTL}$, and $S4_{CTL}$ of primary side switches S1, S2, S3, and S4. Output ports 214 also include secondary switching control ports $S5_{CTL}$, $S6_{CTL}$, $S7_{CTL}$, and $S8_{CTL}$, by which control circuitry 112 provides respective switch control signals to respective switching control ports $S5_{CTL}$, $S6_{CTL}$, $S7_{CTL}$, and $S8_{CTL}$ of secondary side switches S5, S6, S7, and S8, respectively. Complete signal paths from switching control ports $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of control circuitry 112 to $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of DAB 114 are omitted from FIG. 2 for clarity. Nonetheless, switching control ports $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of control circuitry 112 are indeed coupled to $S1_{CTL}$, $S2_{CTL}$, $S3_{CTL}$, $S4_{CTL}$, $S5_{CTL}$, $S6_{CTL}$, $S7_{CTL}$, and $S8_{CTL}$ of DAB 114 via respective signal paths. As described in further detail below, in some aspects, control circuitry 112 is configured to cause switch control signals (e.g., switch control signals $S1_{CTL}$, $S2_{CTL}$, $S3_{CTL}$, $S4_{CTL}$ of primary side bridge 220, and/or switch control signals $S5_{CTL}$, $S6_{CTL}$, $S7_{CTL}$, and $S8_{CTL}$ of secondary side bridge 222) to switch according to a switching sequence including multiple stages, with the top switches being enabled concurrently with one another or the bottom switches being enabled concurrently with one another during at least one of the stages of the switching cycle.

In some embodiments, types of switches and/or switch configurations that differ from those shown in FIG. 2 may be utilized (e.g., switches with source and drain terminals located in positions that are the opposite of those shown in FIG. 2, active-high switches that are enabled with a logic-high gate voltage, active-low switches that are enabled with a logic-low gate voltage, or the like). The particular switches and configurations and logic levels shown and described herein are provided as illustrative examples. The principles herein apply similarly to other types of switches and/or switch configurations. Unless otherwise indicated herein, the switches relating to the examples described herein are active-high switches that are enabled (e.g., activated) with a logic-high gate voltage and are disabled (e.g., inactivated) with a logic-low gate voltage.

Figure 3:
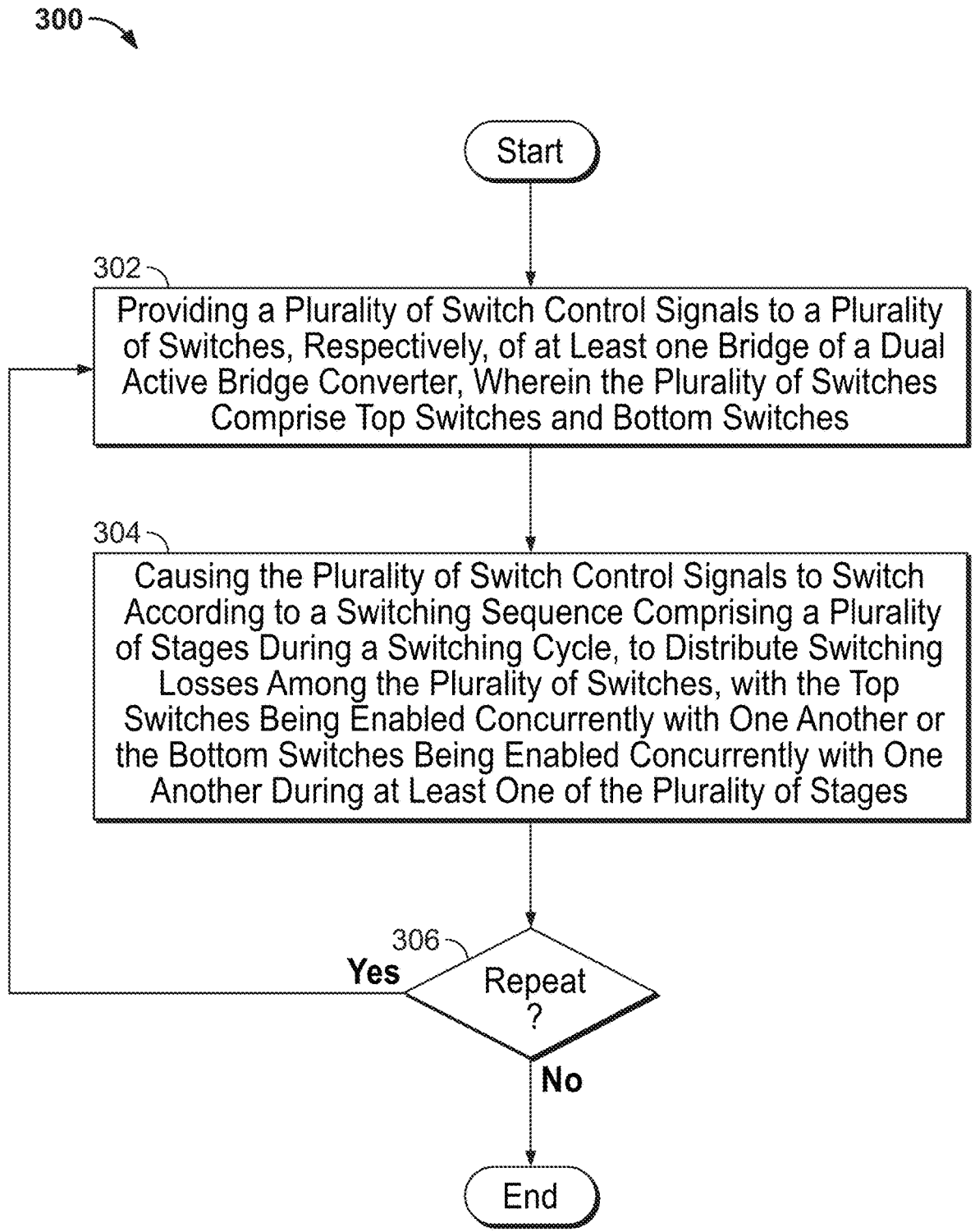
FIG. 3 depicts an illustrative flowchart of a process for controlling a dual active bridge converter, in accordance with some embodiments of the disclosure.

FIG. 3 depicts an illustrative flowchart of a process 300 for controlling DAB converter 114, in accordance with some embodiments of the disclosure. At 302, switch control signals (e.g., $S1_{CIL}$, $S2_{CIL}$, $S3_{CIL}$, and $S4_{CIL}$ and/or $S5_{CIL}$, $S6_{CIL}$, $S7_{CIL}$, and $S8_{CTL}$) are provided to respective switches (e.g., S1, S2, S3, and S4, and/or S5, S6, S7, and S8) of at least one bridge (e.g., primary bridge 220 and/or secondary bridge 222) of DAB converter 114. Switches S1, S3, S5, and S7 are referred to herein as top switches and switches S2, S4, S6, and S8 are referred to herein as bottom switches. In one example, top switches S1, S3, S5, and S7 have respective source terminals coupled to one or another of the terminals of transformer 218, and bottom switches S2, S4, S6, and S8 have respective drain terminals coupled to one or another of the terminals of transformer 218. In other aspects, DAB converter 114 includes multiple legs, including a first leg made up of switches S1 and S2, a second leg made up of switches S3 and S4, a third leg made up of switches S5 and S6, and a fourth leg made up of switches S7 and S8. Each leg includes a top switch and a bottom switch. Top switches S1 and S3 have a terminal (e.g., a drain terminal) coupled to one another and coupled to a port (e.g., an input port) of DAB converter 114. Top switches S5 and S7 have a terminal (e.g., a drain terminal) coupled to one another and coupled to a port (e.g., an output port) of DAB converter 114. Bottom switches S2 and S4 have a terminal (e.g., a source terminal) coupled to one another and coupled to a port (e.g., an input port) of DAB converter 114. Bottom switches S6 and S8 have a terminal (e.g., a source terminal) coupled to one another and coupled to a port (e.g., an output port) of DAB converter 114.

At 304, control circuitry 112 causes switch control signals (e.g., $S1_{CIL}$, $S2_{CIL}$, $S3_{CTL}$, and $S4_{CIL}$ and/or $S5_{CTL}$, $S6_{CIL}$, $S7_{CIL}$, and $S8_{CTL}$), which are provided to respective switches (e.g., S1, S2, S3, and S4, and/or S5, S6, S7, and S8) of at least one bridge (e.g., primary bridge 220 and/or secondary bridge 222) of DAB converter 114, to switch according to a switching sequence that includes multiple stages. For a given switching cycle and a given bridge (e.g., primary bridge 220 or secondary bridge 222), only the top switches (e.g., S1 and S3 for primary bridge 220; or S5 and S7 for secondary bridge 222) or the bottom switches (e.g., S2 and S4 for primary bridge 220; or S6 and S8 for secondary bridge 222) are enabled (e.g., set to logic-high) to implement an inactive state (e.g., a state during which a voltage applied to the transformer, for instance Vp or Vs, is driven toward zero volts). Example manners in which control circuitry 112 may cause switch control signals to switch according to one or more switching sequences are described in further detail below.

As used herein, a "top-zero" switching sequence refers to a switching sequence for a particular bridge that utilizes only top switches (e.g., switches S1 and S3 for primary bridge 220; or switches S5 and S7 for secondary bridge 222), not bottom switches (e.g., switches S2 and S4 for primary bridge 220; or switches S6 and S8 for secondary bridge 222), to implement inactive states, during which a voltage associated with that bridge (e.g., Vp for primary bridge 220; Vs for secondary bridge 222) toward zero volts. As used herein, a "bottom-zero" switching sequence refers to a switching sequence for a particular bridge that utilizes only bottom switches (e.g., switches S1 and S3 for primary bridge 220; or switches S5 and S7 for secondary bridge 222), not top switches (e.g., switches S1 and S3 for primary bridge 220; or switches S5 and S7 for secondary bridge 222), to implement inactive states, during which a voltage associated with that bridge (e.g., Vp for primary bridge 220; Vs for secondary bridge 222) toward zero volts. Switches S1, S2, S3, and S4 of primary bridge 220 and switches S5, S6, S7, and S8 of secondary bridge 222 are independently controllable and can independently be configured to implement a top-zero switching sequence, a bottom-zero switching sequence, toggling between a top-zero and bottom-zero switching sequences, or any other switching sequence. Primary bridge 220 and secondary bridge 222 need not implement the same type of switching sequence as one another.

At 306, control circuitry 112 determines whether to repeat the cycle of steps 302 and 304. Control circuitry 112 may, for instance, read a configurable setting stored in settings 202 that indicates whether a switching sequence is enabled for a particular bridge (e.g., primary bridge 220 and/or secondary bridge 222) of DAB converter 114. Such a setting may be statically set or may be dynamic, changing on the fly. If control circuitry 112 determines to repeat the steps 302 and 304 ("Yes" at 306) then control passes back to 302. If, on the other hand, control circuitry 112 determines not to repeat steps 302 and 304 ("No" at 306), then process 300 terminates.

Figure 4:
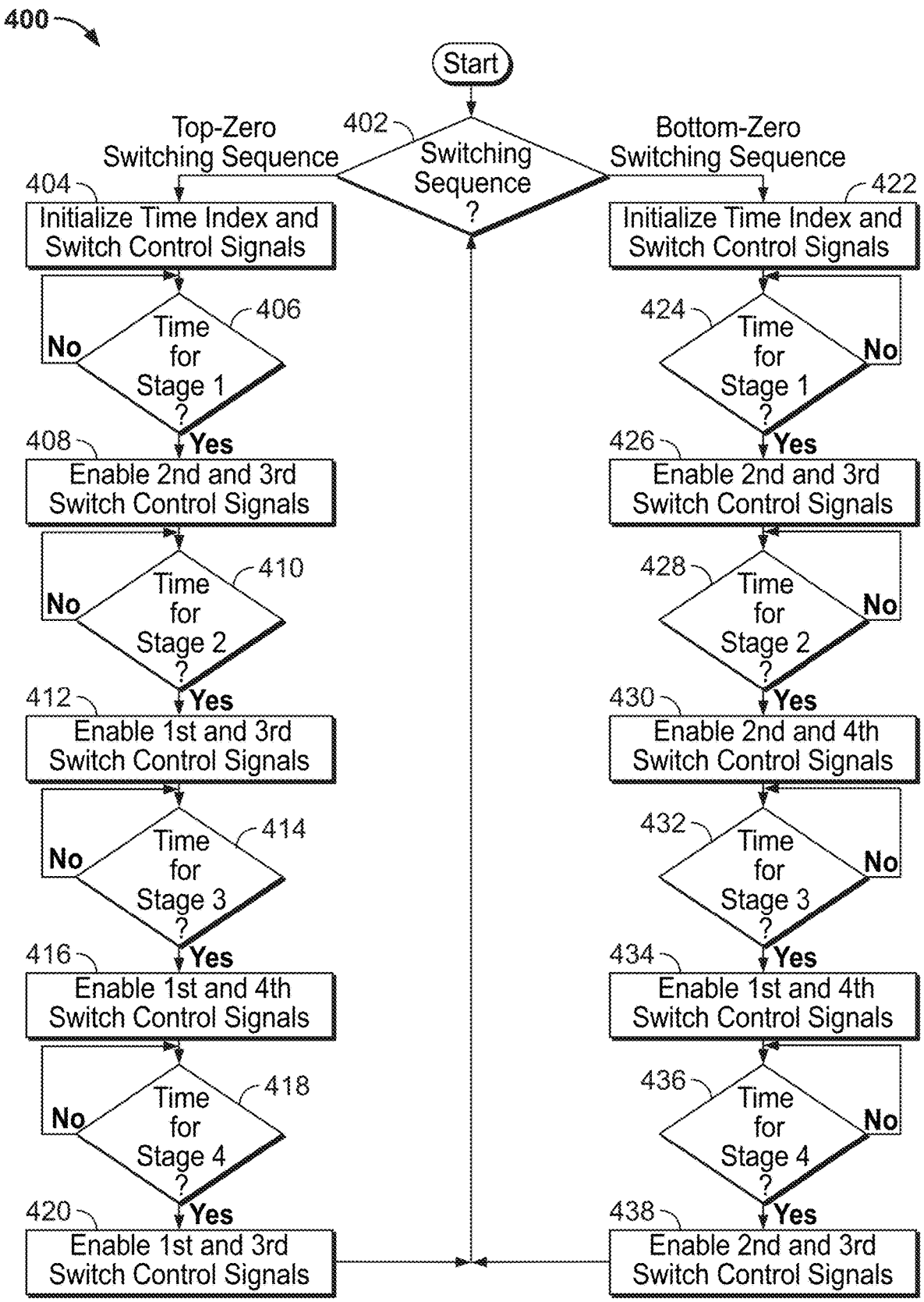
FIG. 4 depicts an illustrative flowchart of a process for causing switch control signals to switch according to a switching sequence, in accordance with some embodiments of the disclosure.

FIG. 4 depicts an illustrative flowchart of a process 400 for causing switch control signals to switch according to a switching sequence during a switching cycle, in accordance with some embodiments of the disclosure. Although not shown in FIG. 4, in some examples, control circuitry 112 retrieves, (e.g., from settings 202, instructions 204, and/or rules 206 stored in storage 110), data defining a first switching sequence (e.g., a top-zero switching sequence for primary bridge 220, where only top switches S1 and S3 are enabled to implement inactive states) and/or a second switching sequence (e.g., a bottom-zero switching sequence for primary bridge 220, where only bottom switches S2 and S4 are enabled to implement inactive states), for use in causing switch control signals (e.g., $S1_{CIL}$, $S2_{CIL}$, $S3_{CIL}$, $S4_{CIL}$, $S5_{CIL}$, $S6_{CIL}$, $S7_{CIL}$, and $S8_{CIL}$) to switch according to the first switching sequence and/or the second switching sequence as described below. FIG. 5A depicts data structures 502-1 and 504-1 that may be stored in, and retrieve from, storage 110 and that represent an illustrative time-based first switching sequence and an illustrative second switching sequence, respectively, for utilization in controlling switches of primary bridge 220 of DAB converter 114, in accordance with some embodiments of the disclosure. Data structure 502-1, for instance, includes stage numbers 506-1, time index ranges 508-1, switch identifiers 510-1, and switch control signal values 512-1 defining the first switching sequence. Likewise, data structure 504-1 includes stage numbers 514-1, time index ranges 516-1, switch identifiers 518-1, and switch control signal values 520-1 defining the second switching sequence. For each stage (506-1 or 514-1), the time index range (508-1 or 516-1) indicates a range of times (e.g., within a discretized timeline of a switching sequence) during which certain switches (510-1 or 518-1) are to have certain switch control signal values (512-1 or 520-1).

FIG. 5B depicts data structures 502-2 and 504-2 that may be stored in, and retrieve from, storage 110 and that represent an illustrative time-based first switching sequence (e.g., a top-zero switching sequence for secondary bridge 222, where only top switches S5 and S7 are enabled to implement inactive states) and an illustrative second switching sequence (e.g., a bottom-zero switching sequence for secondary bridge 222, where only bottom switches S6 and S8 are enabled to implement inactive states), respectively, for utilization in controlling switches of secondary bridge 222 of DAB converter 114, in accordance with some embodiments of the disclosure. Data structure 502-2, for instance, includes stage numbers 506-2, time index ranges 508-2, switch identifiers 510-2, and switch control signal values 512-2 defining the first switching sequence. Likewise, data structure 504-2 includes stage numbers 514-2, time index ranges 516-2, switch identifiers 518-2, and switch control signal values 520-2 defining the second switching sequence. For each stage (506-2 or 514-2), the time index range (508-2 or 516-2) indicates a range of times (e.g., within a discretized timeline of a switching sequence) during which certain switches (510-2 or 518-2) are to have certain switch control signal values (512-2 or 520-2). Although the switching sequences shown in FIGS. 5A and 5B each run from stages 1 to 2 to 3 to 4, the switching sequences may start at a stage other than 1. The switching sequences may, for instance, run from stage 2 to 3 to 4 to 1, or from stage 3 to 4 to 1 to 2, or from stage 4 to 1 to 2 to 3.

At 402, control circuitry 112 determines whether to enable the first switching sequence (e.g., the top-zero switching sequence) or the second switching sequence (e.g., the bottom-zero switching sequence). For instance, control circuitry 112 may read from settings 202 a switching sequence setting (e.g., a flag or a toggle bit) stored in association with a particular bridge (e.g., primary bridge 220 or secondary bridge 222) of DAB converter 114 to make the determination at 402. Alternatively, control circuitry 112 may make the determination at 402 by determining which of the first and second switching sequence was most recently enabled for a particular bridge and automatically selecting the other of the first and second switching sequence at 402 so as to toggle between the first and second switching sequences. If control circuitry 112 determines to enable the first switching sequence ("Top-Zero Switching Sequence" at 402), then control passes to 404.

At 404, control circuitry 112 initializes a time index and values of switch control signals. In one example, for primary bridge 220 for illustrative purposes, at 404 control circuitry 112 may set to zero a digital value that represents a discretized temporal offset into a period of the first switching sequence, setting values of switch control signals $S1_{CTL}$, $S2_{CTL}$, $S3_{CTL}$, and $S4_{CTL}$ equal to any desired initialized values for the first switching sequence. Control then passes to 406.

At 406, control circuitry 112 determines whether it is time to enter a first stage (e.g., stage 1) of the first switching sequence. For instance, and with reference to FIG. 5A (using primary bridge 220 as an example, although process 400 is similarly applicable to secondary bridge 222), control circuitry 112 may read a value of an automatically incremented looping digital counter (not shown in the figures) onboard control circuitry 112 and compare the value of the digital counter to a time index range (e.g., 508-1 of FIG. 5A) and determine that it is time to enter the first stage of the first switching sequence if the value of the digital counter indicates a time that falls within the time index range 508-1 associated with stage 1 in data structure 502-1. If control circuitry 112 determines it is not time to enter the first stage of the first switching sequence ("No" at 406), then control remains at 406 to continually (or periodically) repeat the determination. If control circuitry 112 determines it is time to enter the first stage of the first switching sequence ("Yes" at 406), then control passes to 408.

At 408, control circuitry 112 steps into the first stage of the first switching sequence, which is an active state, by enabling the second and third switch control signals (e.g., setting $S2_{CTL}$ and $S3_{CTL}$ to a logic high level, and setting $S1_{CTL}$ and $S4_{CTL}$ to a logic low level). Unless otherwise stated herein, the value of switching signal S1 is complementary to the value of switching signal S2, the value of switching signal S3 is complementary to the value of switching signal S4, the value of switching signal S5 is complementary to the value of switching signal S6, and the value of switching signal S7 is complementary to the value of switching signal S8. For clarity, certain complementary signals are omitted from certain figures. Control then passes to 410.

At 410, control circuitry 112 determines whether it is time to enter a second stage (e.g., stage 2) of the first switching sequence in a manner similar to how control circuitry 112 made the determination at 406. If control circuitry 112 determines it is not time to enter the second stage of the first switching sequence ("No" at 410), then control remains at 410 to continually (or periodically) repeat the determination, while switch control signals $S1_{CTL}$, $S2_{CTL}$, $S3_{CTL}$, and $S4_{CTL}$ remain at their values for the first stage. If control circuitry 112 determines it is time to enter the second stage of the first switching sequence ("Yes" at 410), then control passes to 412.

At 412, control circuitry 112 steps into the second stage, which is an inactive state, by enabling the first and third switch control signals (e.g., setting $S1_{CTL}$ and $S3_{CTL}$ to a logic high level, and setting $S2_{CTL}$ and $S4_{CTL}$ to a logic low level). Control then passes to 414.

At 414, control circuitry 112 determines whether it is time to enter a third stage (e.g., stage 3) of the first switching sequence in a manner similar to how control circuitry 112 made the determination at 406. If control circuitry 112 determines it is not time to enter the third stage of the first switching sequence ("No" at 414), then control remains at 414 to continually (or periodically) repeat the determination, while switch control signals $S1_{CTL}$, $S2_{CTL}$, $S3_{CTL}$, and $S4_{CTL}$ remain at their values for the second stage of the first switching sequence. If control circuitry 112 determines it is time to enter the third stage of the first switching sequence ("Yes" at 414), then control passes to 416.

At 416, control circuitry 112 steps into the third stage of the first switching sequence, which is an active state, by enabling the first and fourth switch control signals (e.g., setting $S1_{CTL}$ and $S4_{CTL}$ to a logic high level, and setting $S2_{CTL}$ and $S3_{CTL}$ to a logic low level). Control then passes to 418.

At 418, control circuitry 112 determines whether it is time to enter a fourth stage (e.g., stage 4) of the first switching sequence in a manner similar to how control circuitry 112 made the determination at 406. If control circuitry 112 determines it is not time to enter the fourth stage of the first switching sequence ("No" at 418), then control remains at 418 to continually (or periodically) repeat the determination, while switch control signals $S1_{CTL}$, $S2_{CTL}$, $S3_{CTL}$, and $S4_{CTL}$ remain at their values for the third stage of the first switching sequence. If control circuitry 112 determines it is time to enter the fourth stage of the first switching sequence ("Yes" at 418), then control passes to 420.

At 420, control circuitry 112 steps into the fourth stage of the first switching sequence, which is an inactive state, by enabling the first and third switch control signals (e.g., setting $S1_{CTL}$ and $S3_{CTL}$ to a logic high level, and setting $S2_{CTL}$ and $S4_{CTL}$ to a logic low level). Control then passes back to 402 to repeat the determination of which switching sequence to implement for the particular bridge.

If control circuitry 112 determines to enable the second switching sequence ("Bottom-Zero Switching Sequence" at 402), then control passes to 422. At 422, control circuitry 112 initializes a time index and values of switch control signals. In one example, for primary bridge 220 for illustrative purposes, at 404 control circuitry 112 may set to zero a digital value that represents a discretized temporal offset into a period of the first switching sequence, setting values of switch control signals $S1_{CTL}$, $S2_{CTL}$, $S3_{CTL}$, and $S4_{CTL}$ equal to any desired initialized values for the second switching sequence. Control then passes to 424.

At 424, control circuitry 112 determines whether it is time to enter a first stage (e.g., stage 1) of the second switching sequence. For instance, and with reference to FIG. 5A, control circuitry 112 may read a value of an automatically incremented looping digital counter (not shown in the figures) onboard control circuitry 112 and compare the value of the digital counter to a time index range (e.g., 516-1 of FIG. 5A) and determine that it is time to enter the first stage of the second switching sequence if the value of the digital counter indicates a time that falls within the time index range 516-1 associated with stage 1 in data structure 504-1. If control circuitry 112 determines it is not time to enter the first stage of the second switching sequence ("No" at 424), then control remains at 424 to continually (or periodically) repeat the determination. If control circuitry 112 determines it is time to enter the first stage of the second switching sequence ("Yes" at 424), then control passes to 426.

At 426, control circuitry 112 steps into the first stage of the second switching sequence, which is an inactive state, by enabling the second and third switch control signals (e.g., setting $S2_{CTL}$ and $S3_{CTL}$ to a logic high level, and setting $S1_{CTL}$ and $S4_{CTL}$ to a logic low level). Control then passes to 428.

At 428, control circuitry 112 determines whether it is time to enter a second stage (e.g., stage 2) of the second switching sequence in a manner similar to how control circuitry 112 made the determination at 406. If control circuitry 112 determines it is not time to enter the second stage of the second switching sequence ("No" at 428), then control remains at 428 to continually (or periodically) repeat the determination, while switch control signals $S1_{CTL}$, $S2_{CTL}$, $S3_{CTL}$, and $S4_{CTL}$ remain at their values for the first stage of the second switching sequence. If control circuitry 112 determines it is time to enter the second stage of the second switching sequence ("Yes" at 428), then control passes to 430.

At 430, control circuitry 112 steps into the second stage of the second switching sequence, which is an active state, by enabling the second and fourth switch control signals (e.g., setting $S2_{CTL}$ and $S4_{CTL}$ to a logic high level, and setting $S1_{CTL}$ and $S3_{CTL}$ to a logic low level). Control then passes to 432.

At 432, control circuitry 112 determines whether it is time to enter a third stage (e.g., stage 3) of the second switching sequence in a manner similar to how control circuitry 112 made the determination at 406. If control circuitry 112 determines it is not time to enter the third stage of the second switching sequence ("No" at 432), then control remains at 432 to continually (or periodically) repeat the determination, while switch control signals $S1_{CTL}$, $S2_{CTL}$, $S3_{CTL}$, and $S4_{CTL}$ remain at their values for the second stage of the second switching sequence. If control circuitry 112 determines it is time to enter the third stage of the second switching sequence ("Yes" at 432), then control passes to 434.

At 434, control circuitry 112 steps into the third stage of the second switching sequence, which is an active state, by enabling the first and fourth switch control signals (e.g., setting $S1_{CTL}$ and $S4_{CTL}$ to a logic high level, and setting $S2_{CTL}$ and $S3_{CTL}$ to a logic low level). Control then passes to 436.

At 436, control circuitry 112 determines whether it is time to enter a fourth stage (e.g., stage 4) of the second switching sequence in a manner similar to how control circuitry 112 made the determination at 406. If control circuitry 112 determines it is not time to enter the fourth stage of the second switching sequence ("No" at 436), then control remains at 436 to continually (or periodically) repeat the determination, while switch control signals $S1_{CTL}$, $S2_{CTL}$, $S3_{CTL}$, and $S4_{CTL}$ remain at their values for the third stage of the first switching sequence. If control circuitry 112 determines it is time to enter the fourth stage of the second switching sequence ("Yes" at 436), then control passes to 438.

At 438, control circuitry 112 steps into the fourth stage of the second switching sequence, which is an inactive state, by enabling the second and third switch control signals (e.g., setting $S2_{CTL}$ and $S3_{CTL}$ to a logic high level, and setting $S1_{CTL}$ and $S4_{CTL}$ to a logic low level). Control then passes back to 402 to repeat the determination of which switching sequence to implement for the particular bridge.

Figure 6:
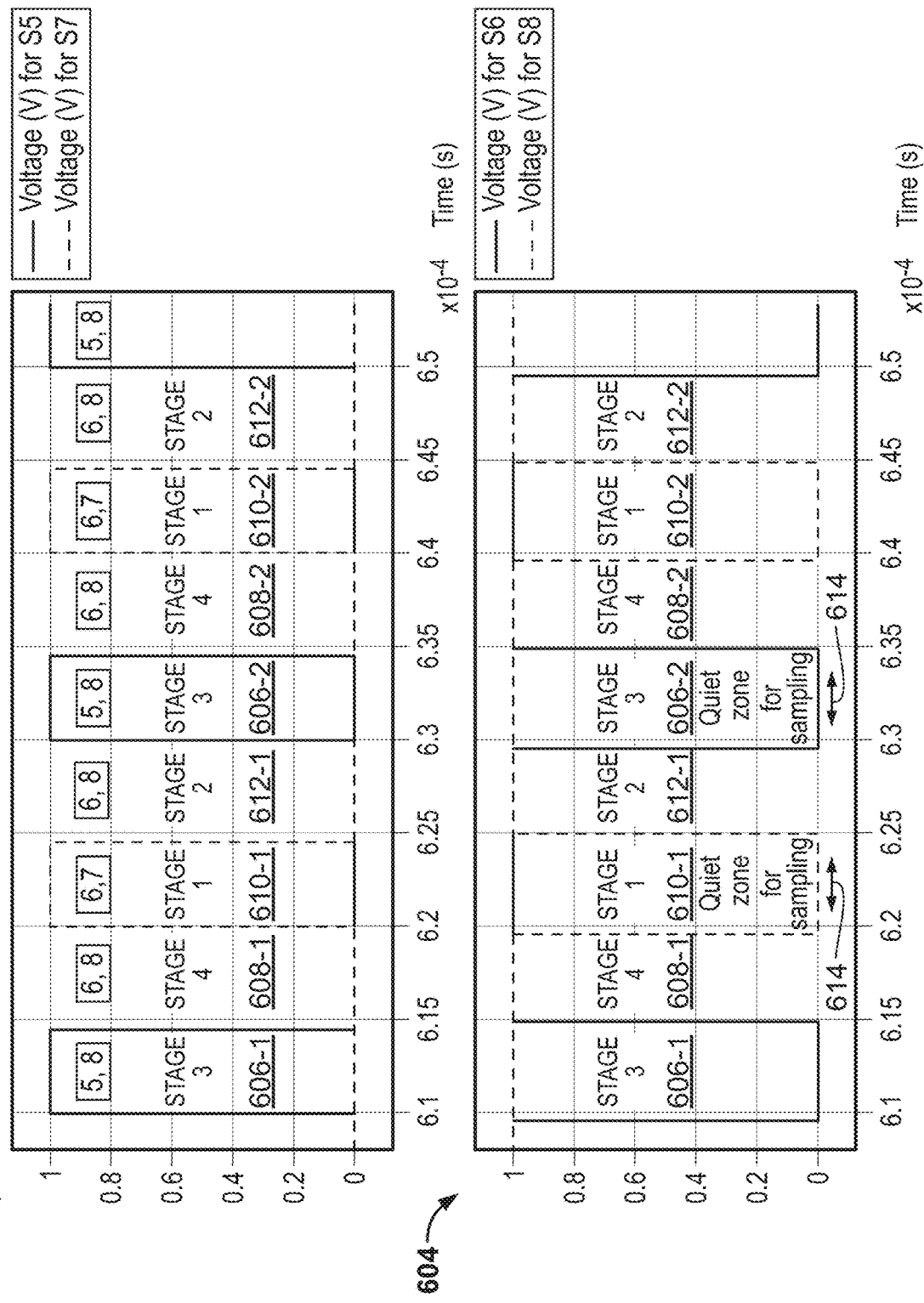
FIG. 6 depicts illustrative voltage timing diagrams of switch control signals of a dual active bridge converter where bottom switches are enabled to implement inactive states, in accordance with some embodiments of the disclosure.

FIG. 6 depicts illustrative voltage timing diagrams 602 and 604 of switch control signals S5, S6, S7, and S8 of secondary bridge 222 of DAB converter 114 where only bottom switches S6 and S8 (not top switches S5 and S7) are enabled to implement inactive states (e.g., stage 2 and stage 4), in accordance with some embodiments of the disclosure. Each switching sequence shown in FIG. 6 includes four stages-stage 3, stage 4, stage 1, stage 2, that are stepped through in order. The initial switching sequence includes stage 3 (606-1), stage 4 (608-1), stage 1 (610-1), stage 2 (612-1), and the second switching sequence repeats that order, proceeding from stage 3 (606-2) to stage 4 (608-2) to stage 1 (610-2) to stage 2 (612-2). Stage 1 and stage 3 are active stages during which voltage Vs (not shown in FIG. 6) is driven away from zero volts. Stage 2 and stage 4 are inactive stages during which voltage Vs (not shown in FIG. 6) is driven toward zero volts by concurrently enabling switches S6 and S8. Quiet zones 614 for sampling an amount of electrical current at a winding of transformer 218 may be located in middle regions (e.g., regions approximately located at a midpoint between signal level transitions of switches S5, S6, S7, and S8) of stages 1, 2, 3, and/or 4. As can be seen in various voltage and current timing diagrams in FIGS. 6 through 10, in some embodiments certain switch control signals are caused to switch according to a switching sequence that utilizes pulse width modulation signals that are center-aligned (e.g., instead of edge-aligned) with respect to one another to drive the plurality of switch control signals.

Figure 7:
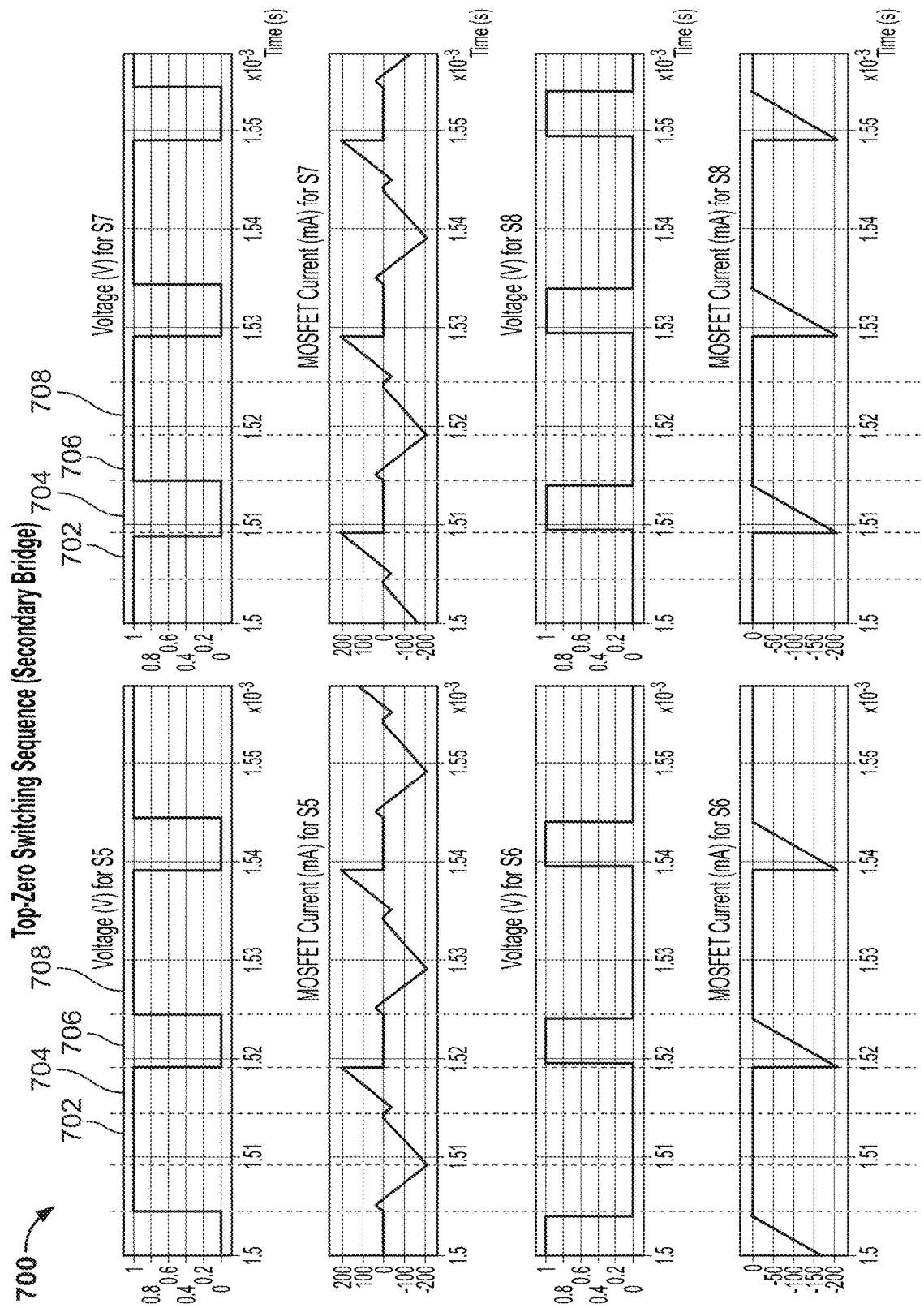
FIG. 7 depicts illustrative voltage and current timing diagrams of switch control signals of a dual active bridge converter where top switches are enabled to implement inactive states, in accordance with some embodiments of the disclosure.

FIG. 7 depicts illustrative voltage and current timing diagrams 700 of switch control signals S5, S6, S7, and S8 of secondary bridge 222 of DAB converter 114 where only top switches S5 and S7 (not bottom switches S6 and S8) are enabled to implement inactive states (e.g., stage 2 and stage 4), in accordance with some embodiments of the disclosure. Each switching sequence shown in FIG. 7 includes four stages-stage 2 (702), stage 3 (704), stage 4 (706), stage 1 (708), that are stepped through in order. Stage 1 and stage 3 are active stages during which voltage Vs (not shown in FIG. 7) is driven away from zero volts. Stage 2 and stage 4 are inactive stages during which voltage Vs (not shown in FIG. 7) is driven toward zero volts by concurrently enabling switches S5 and S7.

Figure 8:
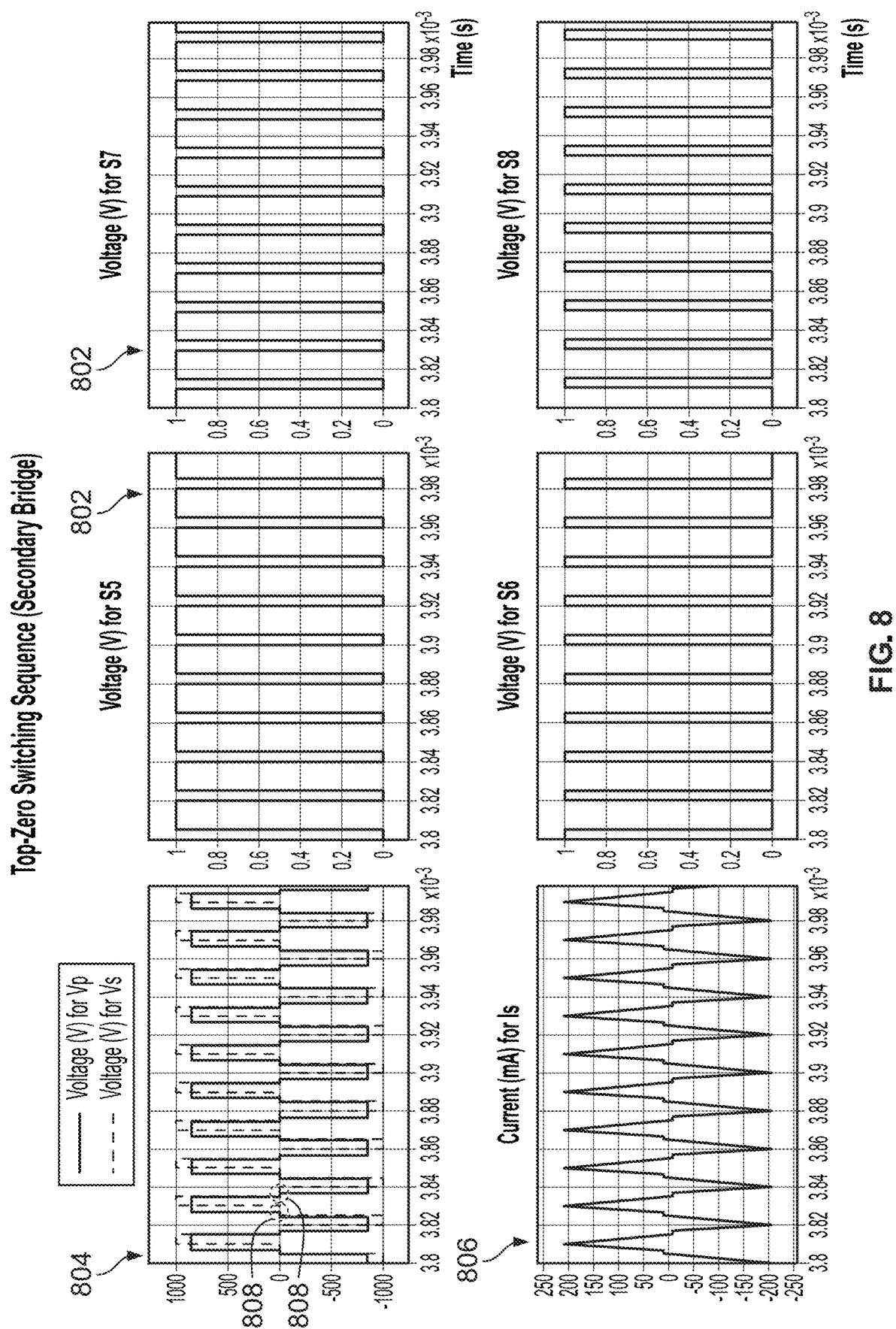
FIG. 8 depicts illustrative voltage and current timing diagrams of switch control signals of secondary switches of a dual active bridge converter where top switches are enabled to implement inactive states, in accordance with some embodiments of the disclosure.

FIG. 8 depicts illustrative voltage timing diagrams 802 of switch control signals S5, S6, S7, and S8 of secondary bridge 222 of DAB converter 114 where only top switches S5 and S7 (not bottom switches S6 and S8) are enabled to implement inactive states (e.g., stage 2 and stage 4), in accordance with some embodiments of the disclosure. Voltage timing diagrams similar to voltage timing diagrams 802 are described above in connection with FIG. 7. Voltage timing diagram 804 shows the voltage Vs and Vp and current timing diagram 806 shows the current Is during the top-zero switching sequence. Example inactive states, during which the voltage at Vs is at or near zero volts are shown as stages 808 in voltage timing diagram 804. Active states in voltage timing diagram 804 are those stages during which voltage Vs is at a non-zero level (e.g., +1000 V or −1000V).

Figure 9:
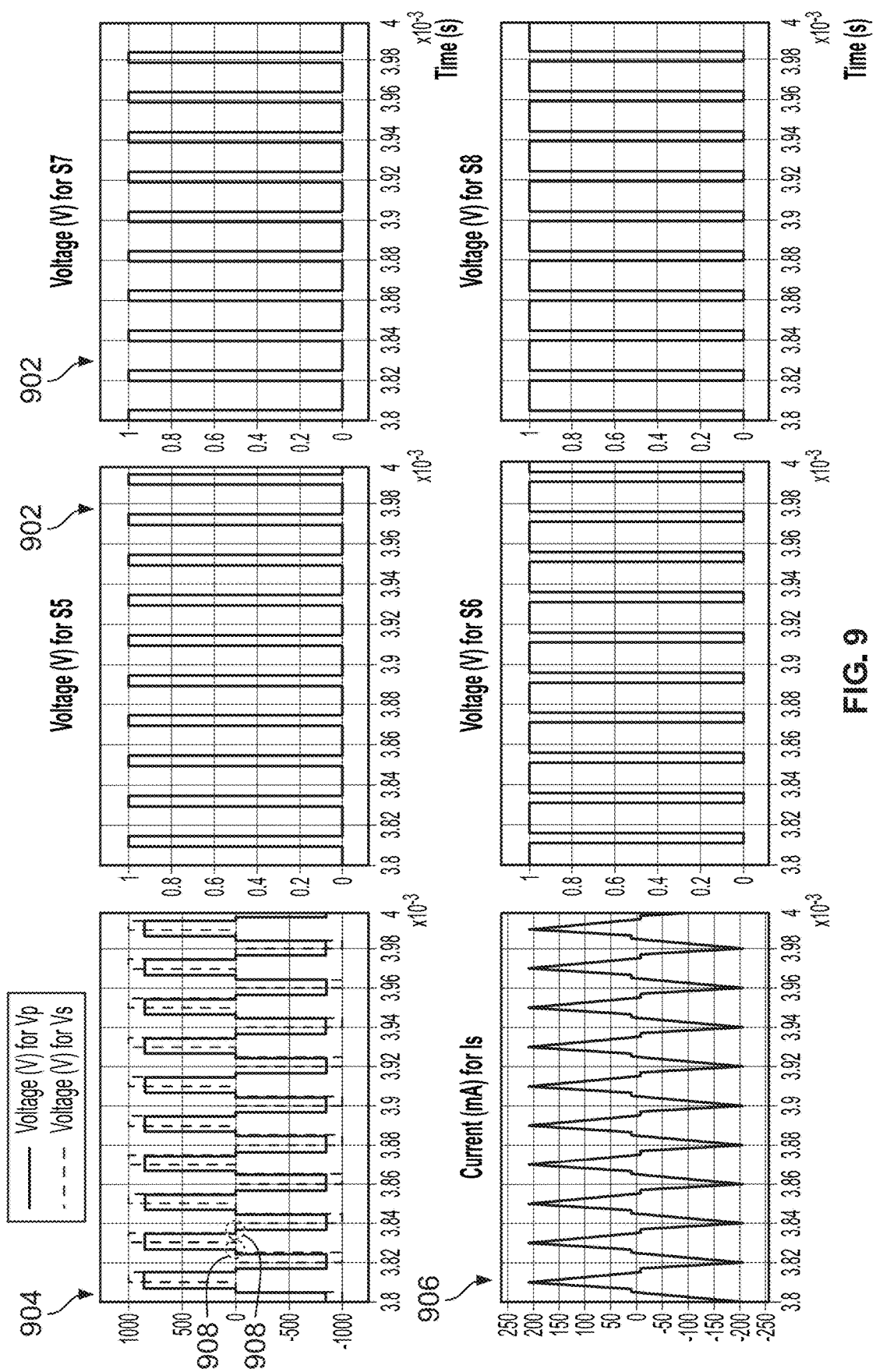
FIG. 9 depicts illustrative voltage and current timing diagrams of switch control signals of secondary switches of a dual active bridge converter where bottom switches are enabled to implement inactive states, in accordance with some embodiments of the disclosure.

FIG. 9 depicts illustrative voltage timing diagrams 902 of switch control signals S5, S6, S7, and S8 of secondary bridge 222 of DAB converter 114 where only bottom switches S6 and S8 (not top switches S5 and S7) are enabled to implement inactive states (e.g., stage 2 and stage 4), in accordance with some embodiments of the disclosure. Voltage timing diagrams similar to voltage timing diagrams 902 are described above in connection with FIG. 6. Voltage timing diagram 904 shows the voltage Vs and Vp and current timing diagram 906 shows the current Is during the bottom-zero switching sequence. Example inactive states, during which the voltage at Vs is at or near zero volts are shown as stages 908 in voltage timing diagram 904. Active stages in voltage timing diagram 904 are those during which voltage Vs is at a non-zero level (e.g., +1000 V or −1000V).

Figure 10:
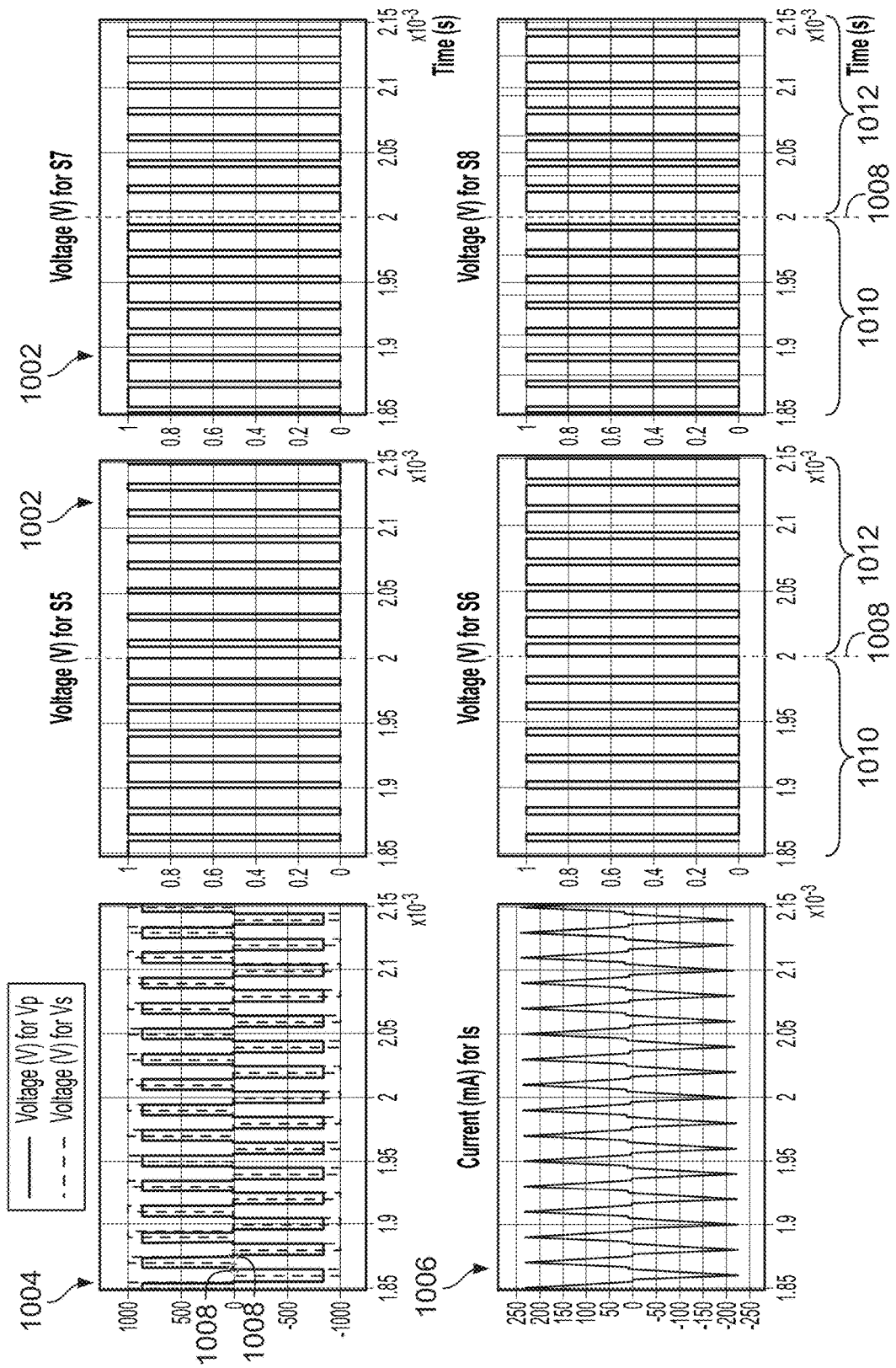
FIG. 10 depicts illustrative voltage and current timing diagrams of switch control signals of secondary switches of a dual active bridge converter that toggles between using top switches and enabling bottom switches, from one switching cycle to the next, to implement inactive states, in accordance with some embodiments of the disclosure.

FIG. 10 depicts illustrative voltage and current timing diagrams of switch control signals of secondary switches of a dual active bridge converter that toggles between using top switches and enabling bottom switches, from one switching cycle to the next, to implement inactive states, in accordance with some embodiments of the disclosure.

FIG. 9 depicts illustrative voltage timing diagrams 1002 of switch control signals S5, S6, S7, and S8 of secondary bridge 222 of DAB converter 114 that toggles, at time 1008, between a first switching sequence 1010 that uses only top switches S5 and S7 (not bottom switches S6 and S8) to implement inactive states (e.g., stage 2 and stage 4), and a second switching sequence 1012 that uses only bottom switches S6 and S8 (not top switches S5 and S7) to implement inactive states (e.g., stage 2 and stage 4), in accordance with some embodiments of the disclosure. Voltage timing diagrams similar to the first switching sequence 1010 and the second switching sequence 1012 are described above in connection with FIG. 7 and FIG. 6, respectively. Voltage timing diagram 1004 shows the voltage Vs and Vp and current timing diagram 1006 shows the current Is during the successive top-zero and bottom-zero switching sequences. Example inactive states, during which the voltage at Vs is at or near zero volts are shown as stages 1008 in voltage timing diagram 1004. Active stages in voltage timing diagram 1004 are those during which voltage Vs is at a non-zero level (e.g., +1000 V or −1000V).

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

What is claimed is:

1. A method for controlling a dual active bridge converter to distribute switching losses, the method comprising:
providing a plurality of switch control signals to a plurality of switches, respectively, of at least one bridge of the dual active bridge converter, wherein the plurality of switches comprises top switches and bottom switches, wherein the plurality of switch control signals switch accordingly to a switching sequence; and either:
causing the top switches to be enabled concurrently with one another during at least one stage of the switching sequence, while preventing the bottom switches from being enabled concurrently with one another during the switching sequence; or
causing the bottom switches to be enabled concurrently with one another during at least one stage of the switching sequence, while preventing the top switches from being enabled concurrently with one another during the switching sequence.

2. The method of claim 1, wherein the plurality of switches have respective terminals coupled to a transformer, and wherein causing to be enabled each of the top switches concurrently with one another during the at least one stage or causing to be enabled each of the bottom switches concurrently with one another during the at least one stage drives a voltage, which is applied to the transformer, toward zero volts.

3. The method of claim 1, wherein causing the top switches to be enabled concurrently with one another during the at least one stage comprises causing the top switches to be enabled concurrently with one another during two distinct stages of the switching sequence.

4. The method of claim 1, wherein causing the bottom switches to be enabled concurrently with one another during the at least one stage comprises causing the bottom switches to be enabled concurrently with one another during two distinct stages of the switching sequence.

5. The method of claim 1, wherein the dual active bridge converter comprises a transformer having a plurality of terminals, each of the plurality of switches is a transistor having a source terminal and a drain terminal, each of the top switches has a source terminal coupled to one of the plurality of terminals of the transformer, and each of the bottom switches has a drain terminal coupled to one of the plurality of terminals of the transformer.

6. The method of claim 1, further comprising:
causing, using control circuitry, the plurality of switch control signals to toggle between switching according to a first switching sequence during a first switching cycle, and switching according to a second switching sequence during a second cycle,
wherein the top switches are enabled concurrently with one another during at least one stage of the first switching cycle, and the bottom switches not enabled concurrently with one another during any stage of the first switching cycle, and
wherein the bottom switches are enabled concurrently with one another during at least one stage of the second switching cycle, and the top switches are not enabled concurrently with one another during any stage of the second switching cycle.

7. The method of claim 6, further comprising:
retrieving, from memory, data defining at least one of the first switching sequence or the second switching sequence,
wherein the plurality of switch control signals are caused to switch according to at least one of the first switching sequence or the second switching sequence based on the retrieved data.

8. The method of claim 1, wherein the switching sequence comprises an active stage, during which the plurality of switch control signals are set to a state that drives a voltage applied to a transformer away from zero volts, and an inactive stage, during which the plurality of switch control signals are set to a state that drives a voltage applied to the transformer toward zero volts.

9. The method of claim 1, wherein causing the plurality of switch control signals to switch according to the switching sequence comprises utilizing pulse width modulation signals that are center-aligned with respect to one another to drive the plurality of switch control signals, thereby generating a quiet zone for sampling in between level transitions of the plurality of switch control signals.

10. A system for controlling a dual active bridge converter to distribute switching losses, comprising:
a memory storing instructions;
output ports; and
control circuitry coupled to the memory and the output ports and configured to execute the instructions to:
provide a plurality of switch control signals to a plurality of switches according to a switching sequence, respectively, of at least one bridge of the dual active bridge converter, wherein the plurality of switches comprises top switches and bottom switches; and either:
cause the top switches to be enabled concurrently with one another during at least one stage of the switching sequence, while preventing the bottom switches from being enabled concurrently with one another during the switching sequence; or
cause the bottom switches to be enabled concurrently with one another during at least one stage of the switching sequence, while preventing the top switches from being enabled concurrently with one another during the switching sequence.

11. The system of claim 10, wherein the plurality of switches have respective terminals coupled to a transformer, and wherein causing to be enabled each of the top switches concurrently with one another during the at least one stage or causing to be enabled each of the bottom switches concurrently with one another during the at least one stage drives a voltage, which is applied to the transformer, toward zero volts.

12. The system of claim 10, wherein causing the top switches to be enabled concurrently with one another during the at least one stage comprises causing the top switches to be enabled during two distinct stages of the switching sequence.

13. The system of claim 10, wherein causing the bottom switches to be enabled concurrently with one another during the at least one stage comprises causing the bottom switches to be enabled during two distinct stages of the switching sequence.

14. The system of claim 10, wherein the dual active bridge converter comprises a transformer having a plurality of terminals, each of the plurality of switches is a transistor having a source terminal and a drain terminal, each of the top switches has a source terminal coupled to one of the plurality of terminals of the transformer, and each of the bottom switches has a drain terminal coupled to one of the plurality of terminals of the transformer.

15. The system of claim 10, wherein causing the plurality of switch control signals to switch according to the switching sequence comprises utilizing pulse width modulation signals that are center-aligned with respect to one another to drive the plurality of switch control signals, thereby generating a quiet zone for sampling in between level transitions of the plurality of switch control signals.

16. A non-transitory computer-readable medium having instructions stored thereon that, when executed by control circuitry, cause the control circuitry to:
provide a plurality of switch control signals to a plurality of switches, respectively, of at least one bridge of a dual active bridge converter, wherein the plurality of switches comprises top switches and bottom switches, wherein the plurality of switch control signals switch according to a switching sequence; and either:
cause the top switches to be enabled concurrently with one another during at least one stage of the switching sequence, while preventing the bottom switches from being enabled concurrently with one another during the switching sequence; or
cause the bottom switches to be enabled concurrently with one another during at least one stage of the switching sequence, while preventing the top switches from being enabled concurrently with one another during the switching sequence.

* * * * *